Nov. 16, 1954  G. C. FRANCIS ET AL  2,694,263
INSTRUMENT FLYING TRAINING GOGGLES
Filed April 12, 1951  3 Sheets-Sheet 1
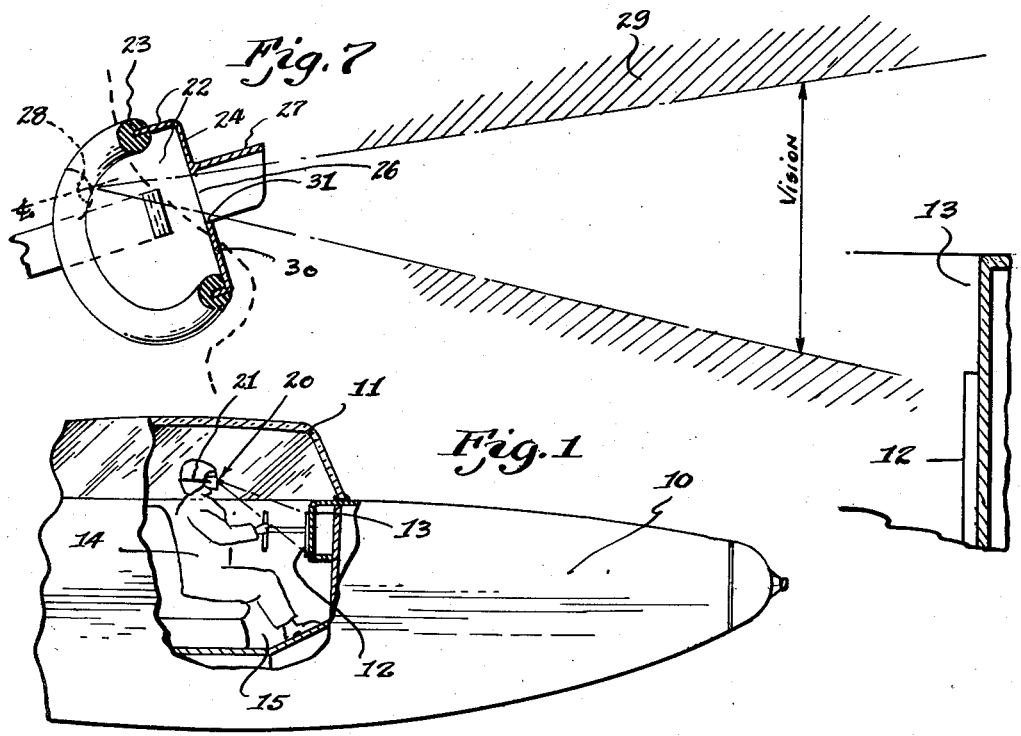
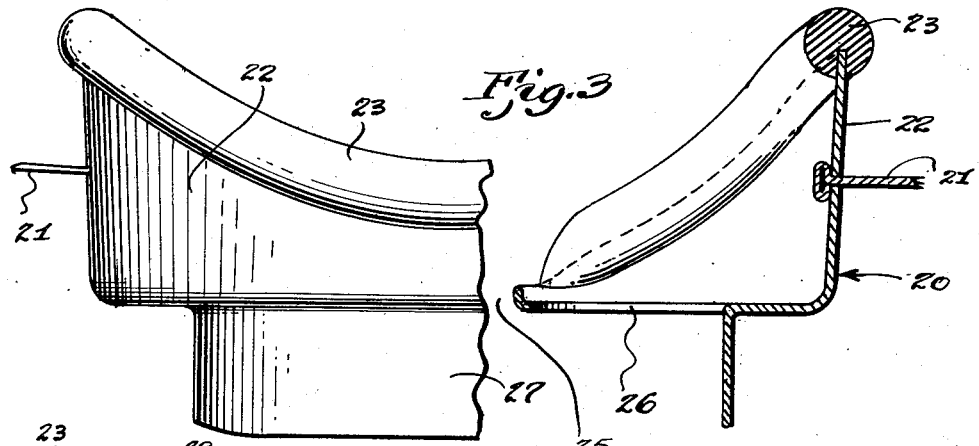
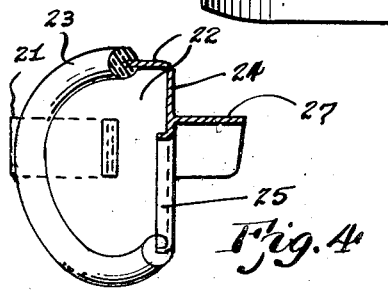
Inventors
Gerald C. Francis
Ned T. Patterson
By
Hankel & Hardesty
Attorneys.

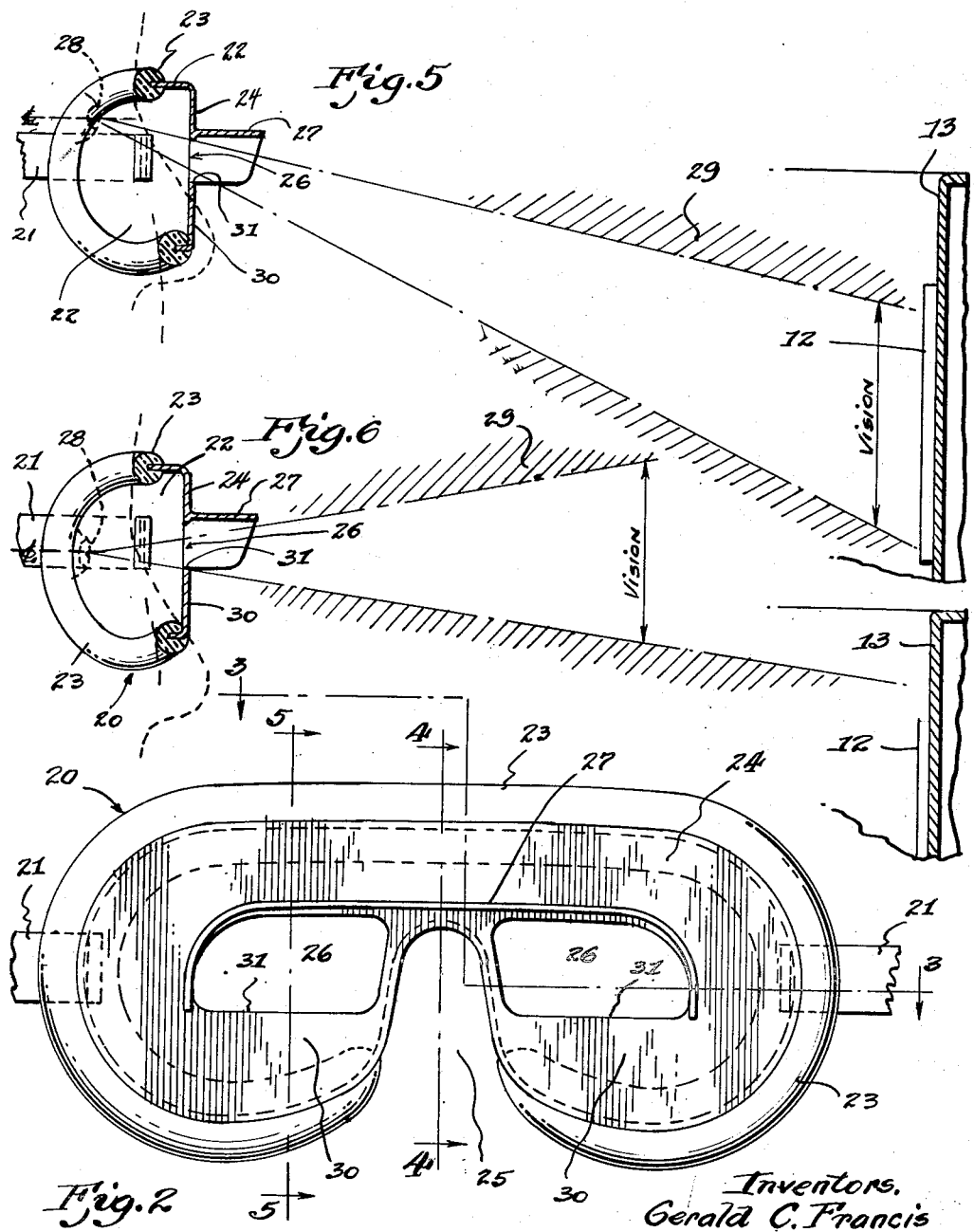

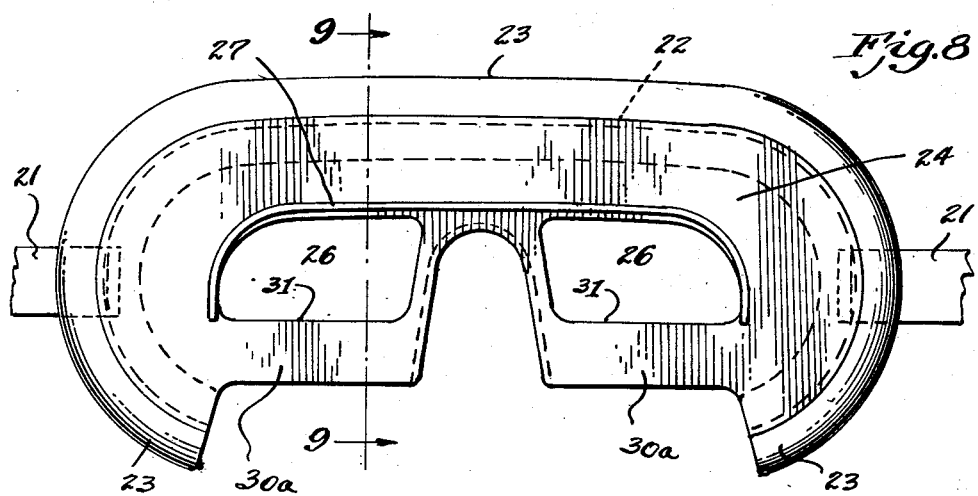
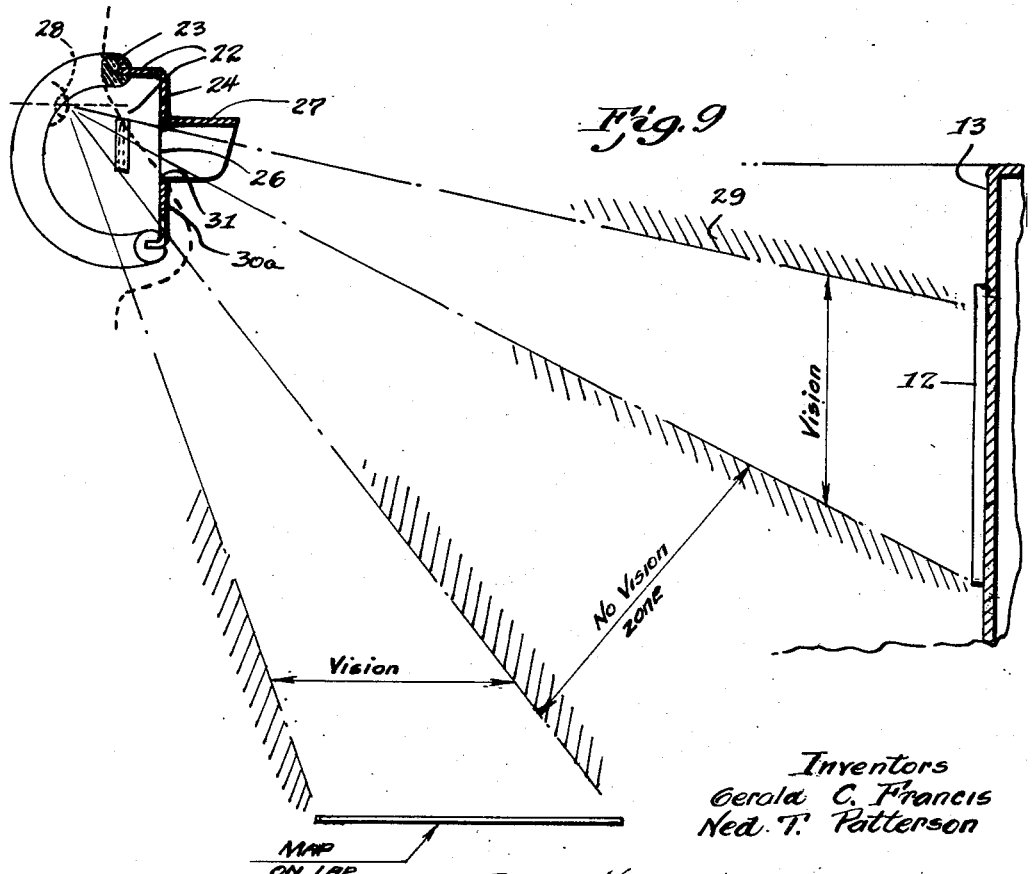

United States Patent Office 2,694,263
Patented Nov. 16, 1954

2,694,263
INSTRUMENT FLYING TRAINING GOGGLES

Gerald C. Francis and Ned T. Patterson, Lansing, Mich.

Application April 12, 1951, Serial No. 220,606

2 Claims. (Cl. 35—12)

The present invention relates to the art of instructing and checking aviators in aircraft operation by instruments, commonly referred to as instrument flight, and more particularly, this invention is concerned with means for limiting the aviator's or pilot's vision in such a manner that the instrument panel only is visible or if same is adjusted for visual flight, the instrument panel is not visible.

In instrument flying and in the training of pilots as well as when undergoing tests in the presence of an instructor or inspector, it has been the practice to either provide a plane with a cockpit which can be completely covered or to employ certain polarized glass which prevents the pilot or aviator from seeing out of the cockpit. To do this, it is necessary that the pilot wear polarized goggles as will prevent him from seeing out of the cockpit. The inspector or co-pilot does not wear these goggles, and he can see through the polarized glass, but his vision is nevertheless somewhat impaired by the polarized or colored glass covering of the cockpit. At night, or at twilight and under certain atmospheric conditions, the vision of the co-pilot, instructor or inspector is very seriously impaired. Other types of equipment embody a hood between the pilot's head and the instrument panel, but such a hood, which shrouds the panel is unsatisfactory because the instructor or inspector cannot see the instrument panel.

A flight instrument, to be worn by the pilot as previously developed by applicants and which is described and claimed in Patent No. 2,522,938, issued September 19, 1950, employs mirrors which may be adjustable if desired, and these have proved quite satisfactory.

It is the object of this invention to eliminate the necessity for such complicated airplane installations by providing a convenient accessory which can be worn by the pilot and readily adjusted to limit the pilot's field of vision solely to the instrument panel. This accessory when properly fitted and adjusted will limit the pilot's field of vision to the instrument panel, and will prevent him from seeing anything else, and the vision of the co-pilot, instructor or inspector is not impaired in any way.

More particularly, when using this accessory, which more nearly resembles a pair of ordinary goggles, the pilot may readily adjust the accessory on his eyes or raise his head to see over the dash and view everything as readily as if he did not have the accessory covering his eyes, but when doing so, his vision of the instrument panel is blocked off. Therefore, the pilot can look over the horizon, or can view the instrument panel, but cannot do both at the same time.

For a more detailed understanding of the invention reference may be had to the accompanying drawings illustrating preferred embodiments of the invention wherein like characters refer to like parts throughout the several views, and in which Fig. 1 is a side elevational view of a part of an airplane, with parts broken away showing a pilot in position and using an accessory constructed in accordance with this invention.

Fig. 2 is a front elevational view of the goggle like accessory.

Fig. 3 is a horizontal plan and sectional view as taken substantially on the line 3—3 of Fig. 2.

Fig. 4 is a vertical sectional view thereof taken on the line 4—4 of Fig. 2.

Fig. 5 is a vertical sectional view taken on the line 5—5 of Fig. 2 and showing the accessory adjusted on the pilot's face so that his vision is restricted solely to a view of the instrument panel.

Fig. 6 is a similar vertical sectional view showing the accessory adjusted on the pilot's face so that his vision of the instrument panel is blocked, but his vision of the horizon is unimpaired.

Fig. 7 is a similar sectional view showing how the pilot must raise his head to look out of the airplane when said accessory is adjusted as shown in Fig. 5, but when so doing, his vision of the instrument panel is blocked.

Fig. 8 is a front elevational view of a goggle like accessory constructed to embody a modified construction, and Fig. 9 is a vertical sectional view showing the accessory adjusted to the pilot's face and in which adjustment he may view the instrument panel, and a map or other instructional data sheet on his lap or mounted conveniently below the instrument panel.

The reference character 10 represents the fuselage of an airplane, 11 the transparent canopy over the cockpit, 12 the instrument panel carried on the instrument board 13, the pilot 14 seated in the cockpit 15 in a position so he normally can view the horizon.

The preferred embodiment of this invention comprises a portable instrument means such as a goggle-like structure 20, being preferably secured to the pilot's head by means of an elastic strap or band 21 slipped around the back of the head. This structure is formed of an opaque substance and is preferably molded or otherwise suitably formed to provide a body portion having a hood structure 22 provided with rear edges shaped to generally conform to the contour of the face, said rear edges being bound by a bead 23 made of soft sponge rubber or other suitable soft and yielding material. The hood structure preferably extends to substantially enclose the eyes and forms a continuous wall structure over the top and to the outside of the eyes, and partially below the eyes as well. The bead 23 closely contacts the pilot's forehead, and the temples and the cheek below the eyes, as will be readily apparent.

The front wall 24 of this hood structure is recessed as at 25 so as to fit over the pilot's nose, the sides of this recess being adapted to lie substantially close alongside the sides of the pilot's nose. To either side of the recess 25, are openings 26, each opening being elongated horizontally and having outer ends quite rounded (see Figs. 2 and 8). Above these openings 26 and extending above both of said openings, is a forwardly projecting shield structure 27, this shield portion preferably extending straight out from the wall 24 and being downwardly turned at the sides to partially enclose the openings 26.

This portable instrument means is adapted to be fitted on the pilot's face, whose eyes are aligned with respect to the openings 26. Reference character 28 (Figs. 5, 6, 7 and 9) designate the pilot's eyes, and it will be observed that the front wall 24 is spaced laterally in front of the eyes a distance usually varying about from one inch to one and one-half inches. The instrument may be initially adjusted "up" or "down" on the pilot's face and for use as a blind flying instrumentality, so that the pilot can fly on instruments, and is thus adjusted to the position generally shown in Fig. 5. In this position, the line of vision is restricted solely to the instrument panel 12. The line of vision is diagrammatically illustrated in Fig. 5, and it will be noted that the upper extent of this line of vision falls below the top of the cockpit, and the pilot is unable to see over the side or above the upper rim of the cockpit, this blocked out region being indicated in Fig. 5 by the shaded area 29. Thus the hood is dimensioned to space the apertured front wall with respect to the pilot's eye, so that a given dimension of the opening in said front wall of the hood or casing will subtend an angle, with the pilot's eye at the apex thereof, substantially the same as the angle subtended by a corresponding dimension of the apparent area of the instrument panel.

In order for the pilot to see over the side of the cockpit, he must tilt his head back (see Fig. 7) or adjust the position of the flight instrument on his face (see Fig. 6), and in both instances, it will be noted that the opaque wall portion 30 lying immediately below the openings 26 will block his vision of the instrument panel. Thus the pilot can either see out or can view the instrument panel, but he cannot do both at the same time. The upper edge 31 of wall portions 30, which form the lower edge of the openings 26 is substantially straight and horizontal, and when the pilot substantially aligns this edge 31 with the lowest extremity or edge of the instrument panel, the flight instrument is adjusted for instrument flying, his vision beyond or above the upper edge of the instrument panel being completely blocked off. The depth of these openings 26 are such, and the laterally spacing of the wall 24 forwardly of the edges is such that the pilot's vision is limited solely to the panel 12, when so adjusted so as to be aimed at said instrument panel.

In the modified structure illustrated in Figs. 8 and 9, the instrument is constructed substantially like the structure of Fig. 2 insofar as the hood structure and wall 24, openings 26 and shield is concerned. The wall portion 30a below the eye openings 26 is partially cut away from below, so the pilot can turn his eyes downwardly and view a map or other flight data carried on his lap or other convenient support, the wall 30a effectively producing a "no vision zone" (see Fig. 9) so that the instrument panel 12 is blocked off when the pilot tilts his head or adjusts the flight instrument so as to see out the cockpit.

The dimensions of this instrument have been determined to conform in general to the usual airplane construction, and these constructions permit of some variation without destroying the effectiveness of the instrument.

Such an instrument as is herein described is particularly applicable and desirable for use in routine instrument instruction and practice flying, all pilots being required to compile a minimum number of hours of instrument flying to secure and maintain their pilot's license, and to periodically pass tests before an inspector.

The above described instrument is particularly useful during instruction and inspection because the co-pilot or inspector has clear vision at all times of the instrument panel as well as out the cockpit, while the student or pilot has only a limited vision, and can only see over the cockpit if he raises his head an abnormal amount. If a pilot did raise his head to see over the cockpit, or adjusted the instrument on his face to raise his line of vision, the inspector or instructor will very readily spot this act.

It will be apparent to anyone skilled in the art to which this invention pertains that various modifications and changes in design and construction may be made without departing from the spirit of the invention or from the scope of the appended claims.

We claim:

1. A vision limiting device for use in the instruction and checking of pilots in aircraft operation by instruments, said device comprising a portable opaque hood structure consisting of unitary top and side walls and a single transverse planar front wall, the rear edge of said top and side walls being contoured to snugly fit a pilot's brow, cheeks and nose thereby enclosing his eyes, and such top and side walls being of a length to position the front wall in substantial spaced relation to the eyes, said planar front wall being provided with horizontally elongated sight openings disposable in front of the eyes and of a size to restrict the pilot's vision to substantially the area of an aircraft instrument panel when the pilot is in normal aircraft-operating position relative to such panel; and means for readily removably securing said hood structure in position against a pilot's face.

2. In the art of instructing and checking pilots in aircraft operation by instruments, a portable instrument means for limiting the vision of the pilot to the instrument panel and comprising an opaque casing open at the rear and having a front wall provided with a pair of openings respectively adapted for alignment with the pilot's eyes, said casing having a hood portion extended rearwardly from said front wall substantially from the periphery thereof and terminating in a contour edge adapted to snugly abut against the pilot's face, and means for securing said casing on the pilot's face, said hood having a dimension which spaces said apertured front wall of the casing with respect to the pilot's eye so that a given dimension of the opening in said front wall of the casing will subtend an angle, with the pilot's eye at the apex thereof, substantially the same as the angle subtended by a corresponding dimension of the apparent area of the instrument panel, said front wall portion of said instrument means terminating in a horizontally extending recessed straight edge extending substantially the full effective width of said instrument and providing an open space underlying said pair of openings through which said pilot may view a map or other flight data disposed on the pilot's lap or in a region adjacent thereto within the cockpit.

References Cited in the file of this patent

UNITED STATES PATENTS

| Number | Name | Date |
|---|---|---|
| 1,844,232 | Tharp | Feb. 9, 1932 |
| 2,172,287 | Loy | Sept. 5, 1939 |
| 2,255,197 | Thomas | Sept. 9, 1941 |
| 2,270,238 | Clarke et al. | Jan. 20, 1942 |
| 2,388,574 | Ring | Nov. 6, 1945 |
| 2,393,533 | Heinz | Jan. 22, 1946 |
| 2,475,522 | Scherkenbach | July 5, 1949 |
| 2,522,938 | Francis et al. | Sept. 19, 1950 |
| 2,591,752 | Wicklund | Apr. 8, 1952 |

FOREIGN PATENTS

| Number | Country | Date |
|---|---|---|
| 1,633 | Great Britain | Jan. 23, 1903 |
| 16,049 | Great Britain | July 5, 1910 |
| 72,947 | Austria | Jan. 10, 1917 |
| 118,057 | Great Britain | Aug. 15, 1918 |
| 850,963 | France | Dec. 30, 1939 |